Nov. 17, 1953  R. J. IFIELD  2,659,425
LIQUID LEVEL REGULATING MEANS FOR USE WITH PRIME MOVERS
Filed Aug. 21, 1950  2 Sheets-Sheet 1

Inventor
R. J. Ifield
By Mason K Downing Siebold
Attys.

Patented Nov. 17, 1953

2,659,425

UNITED STATES PATENT OFFICE 2,659,425

LIQUID FUEL REGULATING MEANS FOR USE WITH PRIME MOVERS

Richard Joseph Ifield, Dural, New South Wales, Australia, assignor to Joseph Lucas Limited, Birmingham, England Application August 21, 1950, Serial No. 180,657

Claims priority, application Great Britain August 22, 1949

8 Claims. (Cl. 158—36)

In various forms of liquid fuel regulating means for jet-propulsion engines, gas turbines and like prime movers, a device is employed for setting up a pressure difference in the fuel supply system at a position between the fuel supply pump and the burner in a combustion chamber, this pressure difference being utilised to control the pump output, or otherwise vary the rate of supply of fuel to the burner.

The object of the invention is to provide improved means for enabling a pressure difference to be utilised for the purpose above mentioned in a simpler and more convenient manner than heretofore.

The invention comprises an apparatus having in combination a chamber which is divided into two compartments by a diaphragm, a conduit adapted to be connected in series with the fuel supply system and having therein a restricted orifice adapted to set up a pressure difference in the liquid forming therethrough, a passage containing a second restricted orifice leading from the entrance side of the first orifice to one of the said compartments, an unrestricted orifice leading from another part of the passage to the other compartment, a valve seating in the first mentioned compartment, a closure member carried by the diaphragm and co-operating with the said seating, a passage leading from the said seating to a discharge flow exit and containing a third restricted orifice, and a further passage extending from a position between the said seating and the last mentioned orifice, which passage is intended to convey the fluid required for actuating or controlling the fuel regulating means.

Figure 1:
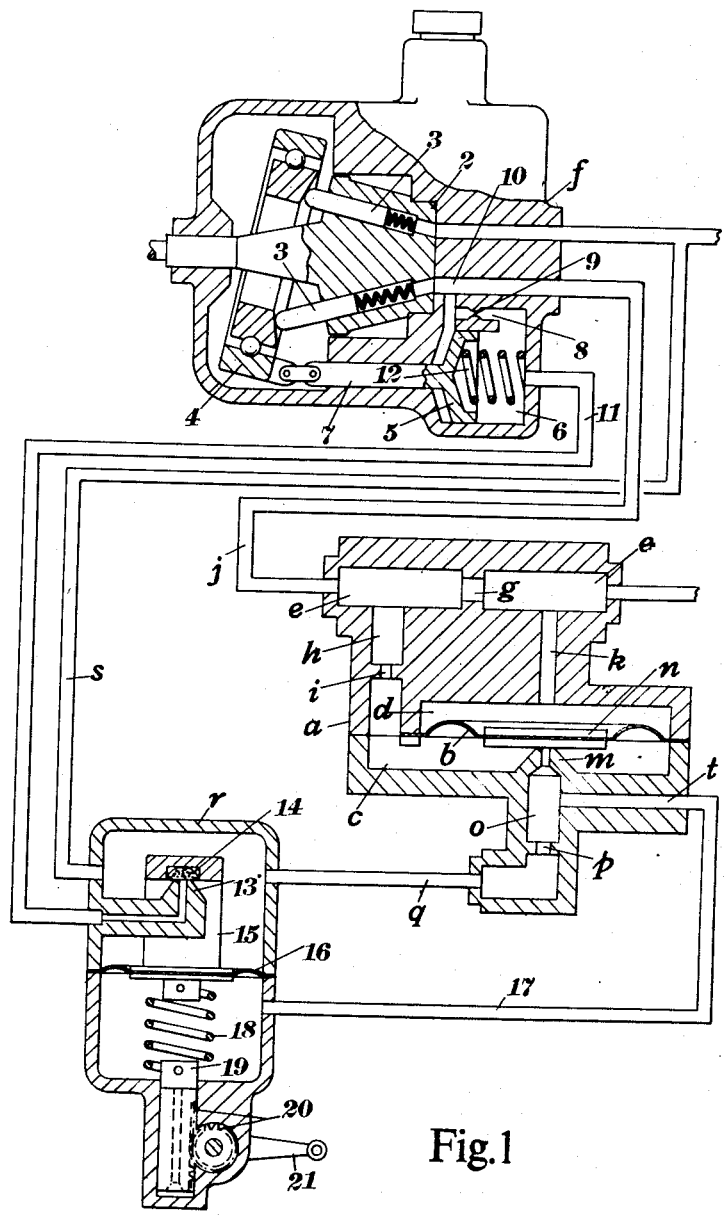
Figure 2:
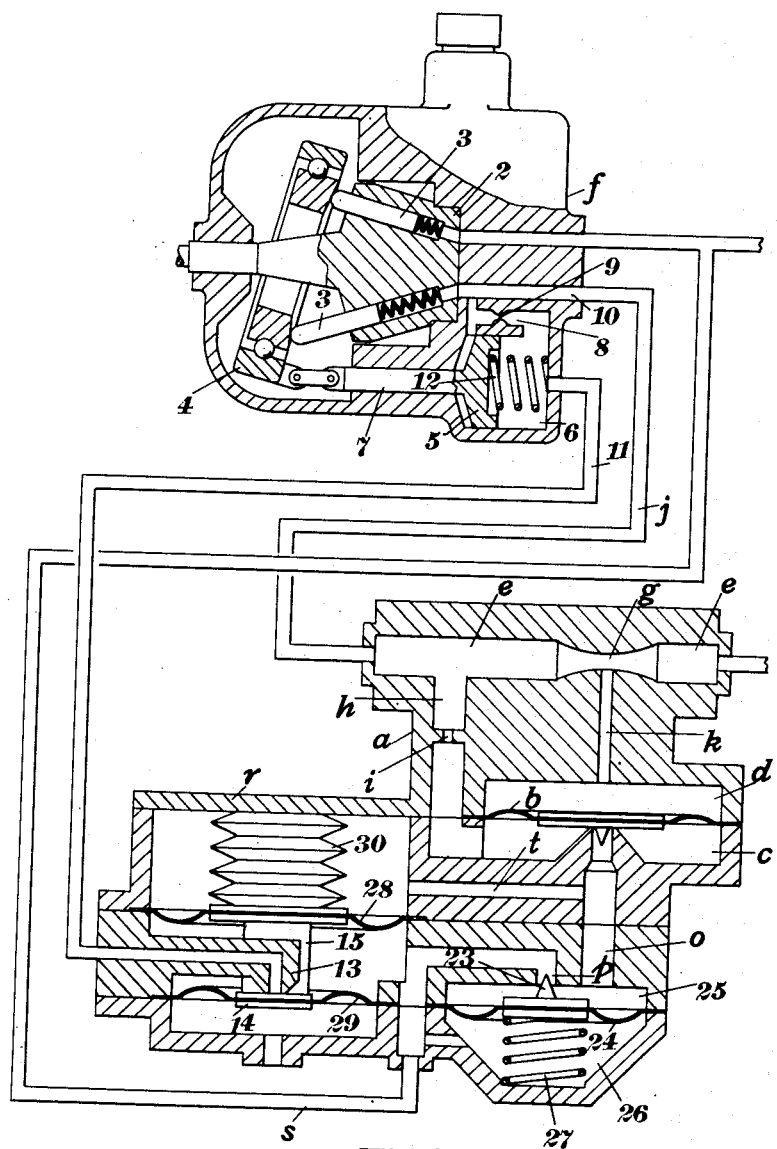

In the accompanying drawings:

Figures 1 and 2 respectively illustrate diagrammatically two embodiments of the invention.

Referring to Figure 1, there is provided a hollow body part $a$ forming a chamber which is divided by a diaphragm $b$ into two compartments $c$, $d$, and in association with this chamber there is provided a conduit $e$ adapted to be connected at its ends to the fuel supply pipe which leads from the fuel pump $f$ to the burner. In the conduit $e$ is provided a restriction $g$ of any convenient diameter. Alternatively a venturi throat may be provided (as shown in Figure 2). From the upstream or entrance side of this orifice extends a passage $h$ leading to the compartment $c$, and in this passage is provided a relatively small restriction $i$ allowing a small quantity of liquid to be by-passed from the main supply conduit $j$ connected to the pump $f$. At the downstream or exit side of the orifice $g$ (or intersecting the venturi throat as in Figure 2), is provided another and unrestricted passage $k$ leading to the other compartment $d$. When in use the diaphragm $b$ is thus normally subjected to equal pressures at its opposite sides, but when a change of rate of flow occurs in the passage $e$ there is set up a transient pressure difference at the opposite sides of the diaphragm.

In the first mentioned compartment $c$ is provided an outlet valve seating $m$ which is controlled by a closure member $n$ carried by the diaphragm $b$ and through which the by-passed liquid can flow to another passage $o$ leading by way of a further (fixed or variable) restricted orifice $p$ to a discharge exit passage $q$. In the example shown, this exit passage is connected to a chamber $r$ from which the liquid can flow back by way of a pipe $s$ to the inlet side of the pump $f$. At a position between the seating $m$ and the orifice $p$ is provided a passage $t$ by which liquid can be conveyed to the controlling means of a fluid operated servo-mechanism used for varying the output of the pump, or for otherwise regulating the rate of flow of fuel to the burner.

The transient pressure difference acting on the diaphragm $b$ serves to actuate the closure member $n$ which controls the by-passed liquid and results in a flow of the by-passed liquid which is in fixed proportion to the flow in the main conduit $j$ and passage $e$. Further, the flow of the by-passed liquid through the restricted orifice $p$ sets up a pressure difference for actuating the control means of the servo-mechanism.

In the example shown in Figure 1, the servo-mechanism is adapted to control the output of the pump $f$, which is of the swash-plate type. The pump comprises a rotary body 2 having therein bores which contain plungers 3. The latter co-operate with an angularly adjustable swash plate 4. The adjustment of the swash plate is effected by the servo-mechanism, which comprises a piston 5 slidable in a cylinder 6 which is incorporated in the pump body, the piston being connected to the swash plate by a rod 7. The two ends of the cylinder are in communication by way of a passage 8 which may be formed (as shown) in the cylinder wall, or in the piston, and it contains a restricted orifice 9. At one end the cylinder is in direct communication with the discharge passage 10 of the pump, and the other end is in communication by way of a pipe 11 with the control valve to be hereinafter described. The piston is loaded by a spring 12 which tends to move the piston and swash plate in the direction for increasing the pump output.

In the arrangement shown in Figure 1, the control valve of the servo-mechanism is contained in the chamber r above mentioned, and it comprises a seating 13 with which co-operates a closure member 14. The part 14 is carried by a stirrup-like member 15 attached to a diaphragm 16 which divides the chamber r into two compartments. The compartment containing the valve has connected to it the pipes q, s above mentioned. The other compartment is in communication with the passage t by way of a pipe 17. Also in this compartment is contained a tension spring 18 which acts on the diaphragm 16 and which at one end is secured to an adjustable anchorage 19, the latter being movable for varying the force exerted on the diaphragm by the spring, by a rack and pinion mechanism 20 operable by a lever 21.

The difference of liquid pressure acting on the diaphragm 16 is utilised for opening the valve (13, 14) against the action of the spring 18. When this valve is closed, the piston 5 is moved by the spring 12 to the position of maximum fuel supply. When the valve is opened, so releasing liquid from the right-hand end of the cylinder C, the preponderating liquid pressure acting on the left hand side of the piston will then move the latter in the direction for restricting the pump output, the amount of restriction depending on the extent of opening of the valve (13, 14).

The alternative arrangement shown in Figure 2, is generally similar to the arrangement above described, but differs in the following particulars. The orifice p, instead of being of fixed size, is variable by means of a throttle 23. The throttle is carried by a diaphragm 24 which separates two compartments 25, 26. The diaphragm is loaded by a spring 27, and is movable under the control of the spring by the liquid pressure difference acting on the two sides of the diaphragm, the chamber 26 being in communication with the pipe s which leads liquid back to the inlet side of the pump. Further, the chamber r is divided into three compartments by two diaphragms 28, 29. The region between the diaphragms contains the seating 13 of the servo-mechanism control valve, and the closure member 14 of this valve is carried by the diaphragm 29, and is connected to the diaphragm 28 by a stirrup piece 15. The compartment above the diaphragm 28 is in communication with the passage t and contains an evacuated elastic capsule 30, and the compartment between the diaphragm is in communication with the outlet side of the orifice p. The compartment beneath the diaphragm 29 may be supplied with liquid at a variable pressure from any appropriate part of the system, or with air drawn from the blower which supplies air to the combustion chamber of the prime mover, or with any other fluid at a pressure corresponding with a variable condition associated with the prime mover.

By this invention I am able to make use of a pressure difference in the fuel supply system more effectively than heretofore.

In the examples above described, the diaphragms mentioned could be replaced by pistons slidable in cylindrical chambers, and it is to be understood that the term "diaphragm" as used herein is intended to include pistons.

Having thus described my invention what I claim as new and desire to secure by Letters Patent is:

1. Liquid fuel regulating means for a prime mover, comprising in combination a fluid-operated servo-mechanism, a conduit through which liquid fuel can be supplied to the prime mover at a rate determined by said servo-mechanism, and which is provided at a position intermediate its ends with a restriction for setting up a pressure difference in the fuel flowing through said conduit, a first passageway leading from a part of said conduit at the upstream side of said restriction and having a second restriction therein, a second and unrestricted passageway leading from a part of said conduit other than at the upstream side of the restriction therein, a chamber, a pressure responsive member dividing said chamber into first and second compartments which are connected to said conduit by said first and second passages respectively to permit access of fuel from different parts of said conduit to said first and second compartments respectively, a valve seating arranged in said first compartment, a third passageway communicating with the discharge side of said valve seating and having a third restriction therein, a valve closure member carried by said pressure responsive member and co-operating with said valve seating to control fuel flow from said first compartment to said third passageway under the control of said pressure responsive member, and a device operable by the fuel pressure in said third passage between said third restriction and said valve seating for controlling said servo-mechanism, the arrangement being such that when the rate of fuel flow in said conduit is steady said pressure responsive member is subjected to equal pressures at its opposite sides, and fuel flows through said valve seating in proportion to the fuel flow through said conduit, but when a change occurs in the rate of fuel flow through said conduit said pressure responsive member is subjected to a transient pressure difference and moves said valve closure member to vary the fuel flow through said valve seating in proportion to said change.

2. Fuel regulating means according to claim 1, in which said third restriction is of fixed size.

3. Fuel regulating means according to claim 1, and having in combination a variable throttle forming said third restriction, another pressure responsive member carrying said throttle, and another chamber divided by the last mentioned pressure responsive member into two compartments which communicate with said liquid discharge passage at opposite sides respectively of said throttle.

4. Fuel regulating means according to claim 1, in which said second and unrestricted passageway communicates with said conduit at the down stream side of the restriction therein.

5. Fuel regulating means according to claim 1, in which said second and unrestricted passageway communicates with the restricted part of said conduit.

6. Fuel regulating means according to claim 1, in which said pressure responsive device comprises in combination a second valve, and means responsive to the pressure of liquid at the discharge side of the other valve for actuating said second valve.

7. Fuel regulating means according to claim 1, in which said pressure responsive device comprises in combination a second valve seating, a second valve closure member for co-operating with said second valve seating to control fluid flow therethrough, and a second pressure responsive member carrying said second closure member, and exposed at opposite sides respectively to the fluid pressures at the discharge sides of the first mentioned valve seating and said third restriction.

8. Fuel regulating means according to claim 1, in which said pressure responsive device comprises in combination a second valve seating, a second valve closure member for co-operating with said second valve seating to control fluid flow therethrough, and a pair of spaced and interconnected pressure responsive members one of which carries said second valve closure member, the region between said pressure responsive members being in communication with the said third passageway at the downstream side of the restriction therein, the region at one side of said pressure responsive members being in communication with the discharge side of the first mentioned valve, and the region at the other side of said pressure responsive members having an inlet for fluid under pressure.

RICHARD JOSEPH IFIELD.

References Cited in the file of this patent

UNITED STATES PATENTS

| Number | Name | Date |
| --- | --- | --- |
| 2,407,115 | Udale | Sept. 3, 1946 |
| 2,424,035 | Ifield | July 15, 1947 |
| 2,446,523 | Bradbury et al. | Aug. 10, 1948 |
| 2,429,005 | Watson et al. | Oct. 14, 1948 |
| 2,474,033 | Chamberlin et al. | June 21, 1949 |
| 2,538,582 | Mordell et al. | Jan. 16, 1951 |